United States Patent
El-Barbari et al.

(10) Patent No.: US 12,470,164 B2
(45) Date of Patent: Nov. 11, 2025

(54) ACTIVE DISCHARGE OF THE DC LINK CAPACITOR OF A THREE-PHASE INVERTER BY WAY OF ROTATING HALF-BRIDGE SHORT-CIRCUITS

(71) Applicant: Bayerische Motoren Werke Aktiengesellschaft, Munich (DE)

(72) Inventors: Said El-Barbari, Freising (DE); Christian Sanabria Von Walter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 136 days.

(21) Appl. No.: 18/270,320

(22) PCT Filed: Jan. 18, 2022

(86) PCT No.: PCT/EP2022/050931
§ 371 (c)(1),
(2) Date: Jun. 29, 2023

(87) PCT Pub. No.: WO2022/171385
PCT Pub. Date: Aug. 18, 2022

(65) Prior Publication Data
US 2024/0088812 A1    Mar. 14, 2024

(30) Foreign Application Priority Data

Feb. 12, 2021   (DE) .................... 10 2021 103 299.7

(51) Int. Cl.
*H02P 3/22*        (2006.01)
*H02P 27/06*       (2006.01)
*B60L 15/00*       (2006.01)

(52) U.S. Cl.
CPC ............. *H02P 27/06* (2013.01); *B60L 15/007* (2013.01); *B60L 2210/40* (2013.01)

(58) Field of Classification Search
CPC .. H02M 7/53871; H02M 1/322; H02P 29/032
See application file for complete search history.

(56) References Cited

U.S. PATENT DOCUMENTS

2009/0230909 A1   9/2009   Hiti et al.
2011/0080149 A1   4/2011   Fukuta et al.
(Continued)

FOREIGN PATENT DOCUMENTS

CN          108667391 A       10/2018
DE    10 2009 000 616 A1       9/2009
(Continued)

OTHER PUBLICATIONS

International Search Report (PCT/ISA/210) issued in PCT Application No. PCT/EP2022/050931 dated May 16, 2022 with English translation (6 pages).

(Continued)

*Primary Examiner* — Muhammad S Islam
(74) *Attorney, Agent, or Firm* — Crowell & Moring LLP (57) ABSTRACT

A control device for a three-phase inverter of a vehicle prime mover is configured to activate active discharge of a DC link of the inverter and at the same time to switch on the lower half-bridge switches of the inverter during the active discharge, and to switch on an upper half-bridge switch of the inverter. The three-phase inverter has three half-bridges, each having an upper half-bridge switch and a lower half-bridge switch.

9 Claims, 5 Drawing Sheets

(56) References Cited

U.S. PATENT DOCUMENTS

| | | | |
|---|---|---|---|
| 2011/0221370 A1 | 9/2011 | Fukuta et al. | |
| 2014/0095005 A1 | 4/2014 | Kanzaki et al. | |
| 2014/0247000 A1 | 9/2014 | Schoenknecht | |
| 2014/0333246 A1 | 11/2014 | Eberlein et al. | |
| 2016/0226410 A1* | 8/2016 | Lopez De Arroyabe | ................... B60L 7/003 |
| 2019/0260286 A1 | 8/2019 | Appel et al. | |
| 2020/0259425 A1* | 8/2020 | Shimada | ................... H02P 3/22 |

FOREIGN PATENT DOCUMENTS

| | | |
|---|---|---|
| DE | 10 2011 083 945 A1 | 4/2013 |
| DE | 10 2011 089 316 A1 | 6/2013 |
| DE | 11 2011 105 295 T5 | 3/2014 |
| DE | 10 2014 200 311 A1 | 7/2015 |

OTHER PUBLICATIONS

German-language Written Opinion (PCT/ISA/237) issued in PCT Application No. PCT/EP2022/050931 dated May 16, 2022 (7 pages).

German-language Search Report issued in German Application No. 10 2021 103 299.7 dated Sep. 29, 2021 with partial English translation (11 pages).

Wu, Z et al.: DC Link Capacitor Active Discharge by IGBT Weak Short Circuit, SAE International J. Advances & Curr. Prac. in Mobility 1(3): 1177-1187, 2019, DOI: 10.4271/2019-01-0606, dated Apr. 2, 2019 (11 pages).

\* cited by examiner

ACTIVE DISCHARGE OF THE DC LINK CAPACITOR OF A THREE-PHASE INVERTER BY WAY OF ROTATING HALF-BRIDGE SHORT-CIRCUITS

BACKGROUND AND SUMMARY OF THE INVENTION

The invention relates to a control device for a three-phase inverter, to a three-phase inverter having such a control device, and to a method for the active discharge of a DC link of a three-phase inverter of a vehicle prime mover.

Electric motor drive systems are assuming an increasingly significant role in the provision of motive power in motor vehicles. The introduction of high-voltage batteries and the inclusion of DC link capacitors with a high capacitance rating in these electric motor drive systems have generated more stringent requirements for electrical safety during the driving of such motor vehicles, particularly in the event of a crash.

During the operation of an inverter for typical electric prime movers in state-of-the-art electric vehicles, DC link capacitors are charged and discharged, for the buffering of energy and the smoothing of voltage spikes.

If, for the purposes of safe operation, for example in the event of a crash, the high-voltage battery is disconnected by way of a battery switch, the DC link capacitor, together with other capacitances in the remainder of the circuit, will retain a significant residual charge, potentially in excess of 40 J, and the terminal voltage of the capacitor will be of equal magnitude to the output voltage of the battery. The voltage of typical vehicle drive batteries lies between 250 V and 450 V. In 800 V systems, which are also employed, having a battery voltage ranging from 650 V to 850 V, the energy content is approximately doubled (at half capacity).

In the event of a crash, this voltage level can be harmful for occupants of the motor vehicle (in the event of the failure of insulation) or for emergency service personnel.

It is therefore necessary, in the interests of safe operation, for energy stored in these capacitances to be rapidly reduced to a safe level, not exceeding 60 V, or for the full decay thereof to be executed.

To this end, in electric vehicle drive systems, in the interests of safe operation, an active discharge of the DC link, inter alia by way of an actively actuated short-circuit of the prime mover is provided, with the objective of achieving a sufficient discharge within two or, optionally, according to the situation, within three, four or five seconds.

An active short-circuit (ASC) of this type, by way of the switch-in of a zero vector, is actively actuated by known motor control circuits or inverter control circuits in specific emergency situations in the vehicle, such as e.g. a vehicle collision, wherein a transition to the safe operation of the vehicle is executed. However, in the absence of an additional discharge device for the DC link capacitor (DLC), which continues to carry a charge, a zero-vector switch-in can result in injury to any persons involved.

A customary method for the discharge of a DLC further to an ASC is a discharge by way of a brake chopper, a resistor which is connected in parallel with the DC link capacitor. In safe operation, the resistor is switched-in, and the energy of the capacitor is then converted into heat by way of the power resistor. The power take-up required is considerable, such that additional heat sinks for the switch and/or the resistor are required. Heat sinks are expensive and require structural space, thereby reducing the power density of the inverter.

A further customary method for the discharge of the DLC further to an ASC involves discharge by way of the motor winding; energy can be discharged by two or three phases of the three-phase AC machine.

The discharge current is converted into heat by the equivalent resistance of the motor windings. No additional components are required for this purpose. However, a sufficiently rapid discharge cannot be ensured in all cases. Moreover, the discharge current flowing in the motor windings can induce unwanted motor torques, as the discharge current is not specifically modulated.

From the journal article "Wu, Z. et al.: DC Link Capacitor Active Discharge by IGBT Weak Short Circuit, SAE Int. J. Advances & Curr. Prac. in Mobility 1(3): 1177-1187, 2019, DOI: 10.4271/2019-01-0606", it is known for a DC link capacitor to be discharged by the weak short-circuiting of an IGBT half-bridge of the three-phase inverter of the power inverter, which is assigned to one of the three phases of the prime mover.

However, this approach requires the provision of different gate voltages and thus, on the grounds of the special components required, is both expensive and potentially fault-susceptible.

In this context, one object of the invention is the improvement of an inverter for an electrically powered motor vehicle, and particularly the discharge of the DC link capacitor in the event of a crash, or in the event of other indications for safe operation.

This object is fulfilled by a control apparatus, by a three-phase inverter, and by a method having the features of the claimed invention.

According to one aspect, a control apparatus for a three-phase AC inverter of a vehicle prime mover is disclosed, wherein the control apparatus can particularly be provided in a motor control device and/or in a control device of the inverter.

The control apparatus is designed (a) to actuate an active discharge of a DC link of the inverter—i.e. in particular, an active discharge of one or more DC link capacitors and, optionally, of other DC link capacitances; (b) to simultaneously switch on the lower half-bridge switches of the inverter during active discharge, particularly for the execution of a switchover of the prime mover to zero-vector operation; and (c) to execute the respectively alternating switch-on of one of the upper half-bridge switches of the inverter, particularly with a temporal offset.

As a result, a rapid discharge of the DC link can be achieved, with no provision of special components for this purpose and, nevertheless, with no thermal overloading of existing components in the three-phase inverter. This is achieved, wherein the short-circuit current is divided by the simultaneous switch-on of all the lower half-bridge switches, in the region thereof, over a plurality of current branches whereas, in the region of the upper half-bridge switches, by way of alternating switching, any thermal overloading of these half-bridges is prevented. The pattern of the temporal interchange between individual upper half-bridge switches for the routing of the short-circuit current can be defined by different logic functions, which are described herein with reference to different potential embodiments.

In the present context, a switch-on of a half-bridge switch is particularly to be understood as conductive switching, particularly between a collector and an emitter, for example for the conduction of the short-circuit current for discharging the DC link.

According to a further aspect, a three-phase inverter for a vehicle prime mover is disclosed, comprising at least (A) three half-bridges, each having an upper half-bridge switch and a lower half-bridge switch, wherein each of the half-bridges is employed for the respective modulation of one current phase of the three-phase AC drive current for the vehicle prime mover, and (B) a control apparatus according to one embodiment of the invention.

According to a further aspect, a method is disclosed for the active discharge of a DC link of a three-phase inverter of a vehicle prime mover, comprising at least the following process steps: (i) in particular, the detection of a critical safety state; (ii) in particular, the activation of a safe operating mode of the inverter; (iii) in particular, the isolation of a drive battery from the DC link of the inverter; (iv) switch-on of the, and particularly of all the lower half-bridge switches of the inverter, particularly for the switchover of the prime mover to zero-vector operation; and (v) the respectively alternating switch-on of one of the lower half-bridge switches of the inverter, particularly with a mutual temporal offset.

According to one embodiment, the switched-on lower half-bridge switches are alternated, until such time as the voltage present on the DC link falls below a limiting value. A very rapid transition of the inverter to a safe operating state can be achieved accordingly.

The invention is based, inter alia, upon the principle whereby the semiconductor switching apparatuses of the inverter are employed for the intentional short-circuiting of the DC link, as a result of which the overall capacitance of the DC link is compelled to execute a very rapid discharge (within milliseconds). In general, both IGBTs and MOS-FETs—depending upon which of these devices are employed in half-bridge switches—have a robust short-circuit current capacity. In particular, IGBTs and MOSFETs can restrict the short-circuit current to five times or ten times the rated current. The main problem is the duration for which semiconductors can accommodate this high current with no resulting thermal burn-out or destruction of the component. Consequently, the uninterrupted short-circuit duration, in the case of an IGBT component, should not exceed 10 µs and, in the case of a SiC-MOSFET component, should not exceed 2 µs to 3 µs (microseconds).

The invention is based, inter alia, upon the concept whereby the short-circuit current for the active discharge of the DC link is led through the upper components of a three-phase inverter in an alternating manner, until such time as the voltage on the DC link achieves, and no longer exceeds a specific withstand voltage threshold, i.e. a limiting value for the DC link voltage and, in this manner, any thermal overloading and consequent destruction of the component are prevented.

For an embodiment of the invention, in particular, a new state machine is implemented, and is synchronized with the gate-driver-desaturation detection circuit (short-circuit detection circuit).

An embodiment of the invention permits the tripping of the desaturation signal for both half-bridges in the half-bridge switch which is assigned to one current phase to be prevented. Instead, for the transition of the inverter to a safe operating state, for example in the event of a crash, in a first step, all the lower half-bridge switches are actively switched on (in an active short-circuit, or ASC). In a second step, the upper half-bridge switch of phase leg 1 is switched on, as a result of which a type 1 short-circuit is triggered in this upper half-bridge switch. As all the lower half-bridge switches are switched on, the short-circuit current in the upper device is divided over the three lower half-bridge switches. It is thus ensured that desaturation detection is only executed in the upper apparatus in phase leg 1, on the grounds of the two- to three-fold higher current. Desaturation detection compels a switch-off of the upper half-bridge switch in phase leg 1 upon the expiry of a predefined time interval, in order to protect the semiconductor. If the upper half-bridge switch in phase leg 1 is switched off, the upper half-bridge switch in phase leg 2 is switched on. In this case, the desaturation detection circuit switches off the upper half-bridge switch in phase leg 2. The upper half-bridge switch in phase leg 3 is then switched on, and so forth. The state machine interchanges, and particularly rotates the switch-on of the upper half-bridge switches, until the DC link is discharged (active discharge AE of the DC link), at least to a level below a limiting value. Setting of the rotation and delay time between switches is such that no thermal burn-out and no destruction of the module occurs.

According to one embodiment, the control apparatus is designed to switch on the upper half-bridge switch of a further phase in conjunction with, or further to a switch-off of the previously switched-on upper half-bridge switch.

In this manner, each of the upper half-bridge switches can be sequentially loaded with the short-circuit current, and thus thermally loaded, whereafter this load is then cleared once more.

According to one embodiment, the control apparatus is designed to switch on the upper half-bridge switch of a further phase in conjunction with, or further to the intervention of short-circuit detection (i.e. a desaturation detection signal), and particularly of the associated switch-off of the previously switched-on upper half-bridge switch.

This permits the alternating switching of the short-circuit current to the individual upper half-bridge switches, not on the basis of a separate loading logic function, but on the basis of a safety protocol which is provided for the switches in any case. In particular, the next upper half-bridge switch in sequence is switched on, if a short-circuit detection signal (desaturation detection signal) is present on the previously switched upper half-bridge switch.

According to one embodiment, the control apparatus is designed to alternate the switch-on of the upper half-bridge switches in turn, i.e. particularly in a rotating manner, such that the switch-on of the upper half-bridge switch on the first current phase is followed by that on the second current phase and on the third current phase, and the upper half-bridge switch on the first current phase is then switched on once more—the switching sequence is thus {1-2-3-1-2-3-1- . . . }. During this time, in principle, all the lower half-bridge switches are switched on.

This permits an active discharge to be sustained over a sufficiently long period of time, such that a non-critical voltage level on the DC link is achieved. In particular, the sequential switching of the short-circuit current to the upper half-bridge switches in turn is timed at cyclic intervals such that, on the first upper half-bridge switch which is energized, no short-circuit detection signal is generated once the third upper half-bridge switch to be energized, in turn, is switched to short-circuit protection mode. By this arrangement, the short-circuit current can be routed through the three upper half-bridge switches in a sequentially cyclic manner, for the full duration of the discharge time required.

According to one embodiment, the control apparatus is designed to switch the next upper half-bridge switch which is to be switched on, at the latest, with a predefined temporal offset with effect from the commencement of the switching of the previous upper half-bridge switch.

An additional safety level to the short-circuit detection signal on the upper half-bridge switches, which is provided in any event, can thus be provided, particularly wherein, for example, according to the type of switches employed, a maximum uninterrupted exposure time of a switch to the short-circuit current is defined.

According to one embodiment, the control apparatus is designed, for the transition of the inverter to a safe operating state, to switch a battery switch for the isolation of a drive battery from the DC current side of the inverter.

A precondition for the safe discharge of the DC link is provided accordingly.

According to one embodiment, the half-bridge switches are configured in the form of IGBTs, and the temporal offset between the sequential switch-on of two upper half-bridge switches does not exceed 10 microseconds.

A maximum safe discharge speed can thus be ensured, also with respect to the thermal overloading of a half-bridge switch which is configured in the form of an IGBT.

According to one embodiment, the half-bridge switches are configured in the form of SiC MOSFETs, and the temporal offset between the sequential switch-on of two upper half-bridge switches does not exceed 3 microseconds.

A maximum safe discharge speed can thus be ensured, also with respect to the thermal overloading of a half-bridge switch which is configured in the form of a silicon carbide MOSFET.

In the present case, the division into lower and upper half-bridge switches is arbitrary, and relates particularly to the representation shown in the figures. Naturally, an arrangement wherein, for the active discharge of the DC link, all the upper half-bridge switches are switched on and, in each case, a lower half-bridge switch is switched on in an alternating manner also represents an embodiment of the invention.

Further advantages and potential applications of the invention proceed from the following description, in conjunction with the figures.

DETAILED DESCRIPTION OF THE DRAWINGS

Figure 1:
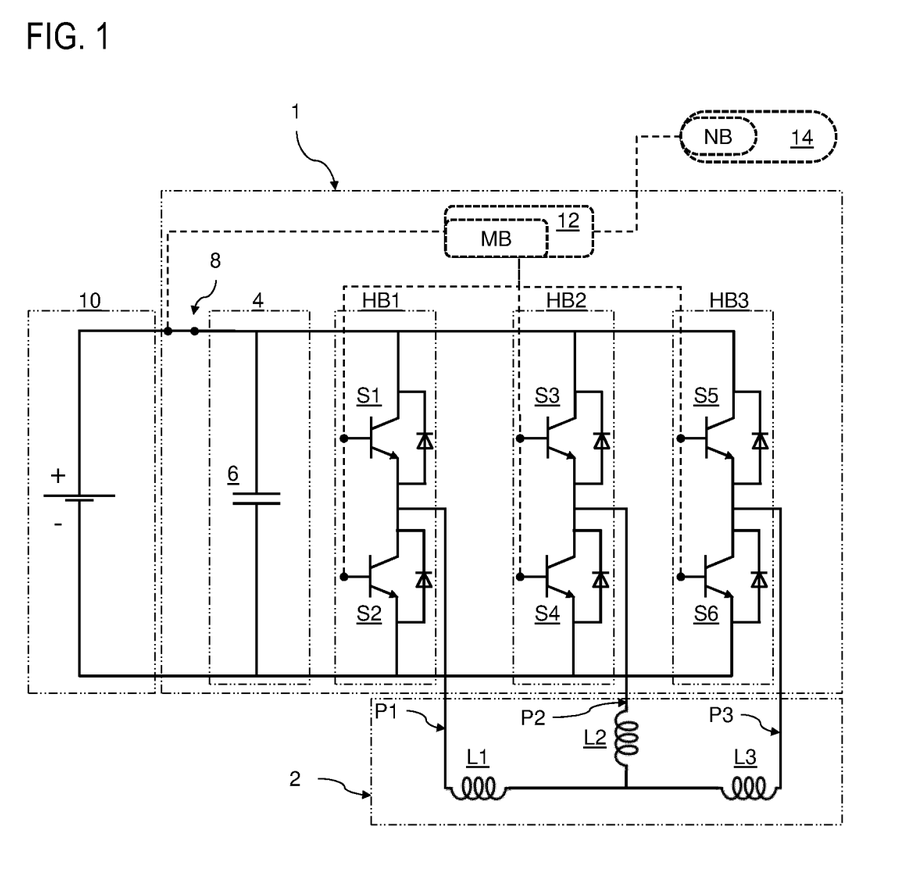
FIG. 1 shows a three-phase inverter which is connected to a vehicle prime mover and, via a DC link, to a vehicle battery, having a control apparatus according to an exemplary embodiment of the invention, in normal operation.

FIG. 1 shows a three-phase inverter 1 for a vehicle prime mover 2, comprising a DC link 4 having a DC link capacitor 6 (which is also intended to be representative of other capacitances which are present in the DC link, forming an overall DC link capacitance) and three half-bridges HB1, HB2 and HB3, each having an upper half-bridge switch S1, S3, S5 and each having a lower half-bridge switch S2, S4 and S6. The half-bridge switches S1 and S2 are thus assigned to the half-bridge HB1 for the modulation of a first current phase P1 of the three-phase AC drive current for the vehicle prime mover 2, the half-bridge switches S3 and S4 are assigned to the half-bridge HB2 for the modulation of the second current phase P2, and the half-bridge switches S5 and S6 are assigned to the half-bridge HB3 for the modulation of the third current phase P3. Each of the half-bridges HB is respectively connected, between its two half-bridge switches, to one of three inductances of the three-phase AC prime mover. In the exemplary embodiment, the half-bridges S are configured in the form of IGBTs, and are each connected to a diode in an anti-parallel arrangement.

The DC link 4 is connectable to, or disconnectable from a drive battery 10 of the vehicle by way of a battery switch 8. In the exemplary embodiment, the drive battery 10 delivers a potential of approximately 400 V DC on the DC link. In an analogous exemplary embodiment, the prime mover, in combination with the drive battery, can also be configured such that a potential of approximately 800 V DC is delivered on the DC link.

The three-phase inverter 1 further comprises a control apparatus 12, wherein the control apparatus, in particular, can be provided in a motor control device of the vehicle and/or in a separately provided control device of the inverter.

In any event, in the exemplary embodiment, the control apparatus 12 is designed to actuate an active discharge AE of the DC link 4 of the inverter 1, for the active discharge of the DC link capacitor 6.

Actuation of the active discharge AE is executed in conjunction with, or immediately further to the detection of the necessity of a safe operating state SB, for example in the event of a crash, by way of an appropriate sensor device 14.

For the transition of the inverter 1 from normal operation NB to a safe operating state SB, the control apparatus 12 is designed to switch off the battery switch 8, for the isolation of the drive battery 10 from the DC current side of the inverter 1. A condition for the safe discharge of the DC link is fulfilled accordingly.

In order to execute the switch from the motor operation of the inverter 1 to an active discharge AE, in conjunction with, or immediately further to the isolation of the drive battery 10, the lower half-bridge switches S2, S4 and S6 of the inverter 1, for the duration of the active discharge AE, are simultaneously and continuously switched to a conducting state, in order to execute the switchover of the prime mover 2 to zero-vector operation (active short-circuit ASC).

To this end, in each case, one of the upper half-bridge switches S1, S3 and S5 of the inverter is switched to a conducting state in an alternating manner, with a mutual temporal offset. In the exemplary embodiment, the half-bridge switches S are configured in the form of IGBTs, such that a maximum exposure of one of the upper half-bridge switches S1, S3 or S5 to the short-circuit current of a typical vehicle battery, with a rating of approximately 400 V and customary current strengths, does not exceed 10 ms before this switch is switched off and the next half-bridge switch is switched to a conducting state. Although the specified value of 10 μs relates to typical applications in state-of-the-art BEVs or PHEVs, a higher or lower value can also be selected, in the event of other voltages and/or current strengths.

In the exemplary embodiment, the next half-bridge switch S3 to be switched on in sequence is switched further to the switch-off of the previously switched-on upper half-bridge switch S1 in response to a short-circuit detection (for example in the form of a desaturation detection signal D).

Correspondingly, the on-time of each of the upper half-bridge switches S1, S3 and S5 is limited by short-circuit detection on each of these switches, such that none of the switches can sustain thermal damage as a result of the conduction of the short-circuit current.

The upper half-bridge switches are switched in turn, in a rotating manner, such that the switch-on of the upper half-bridge switch S1 on a first current phase is followed by that of the switch S3 on the second current phase and that of the switch S5 on the third current phase, and the switch S1 on the first current phase is then switched on once more—the switching sequence is thus {1-3-5-1-3-5-1-...}. During this switching operation for active discharge AE, in principle, all the lower half-bridge switches are switched on (active short-circuit ASC). In the exemplary embodiment, a maximum temporal offset Δt between the switching of the sequentially switched upper half-bridge switches, if necessary, can be set at 10 microseconds, as an additional safety feature to short-circuit detection D, as the switches are configured in the form of IGBTs.

Figure 2:
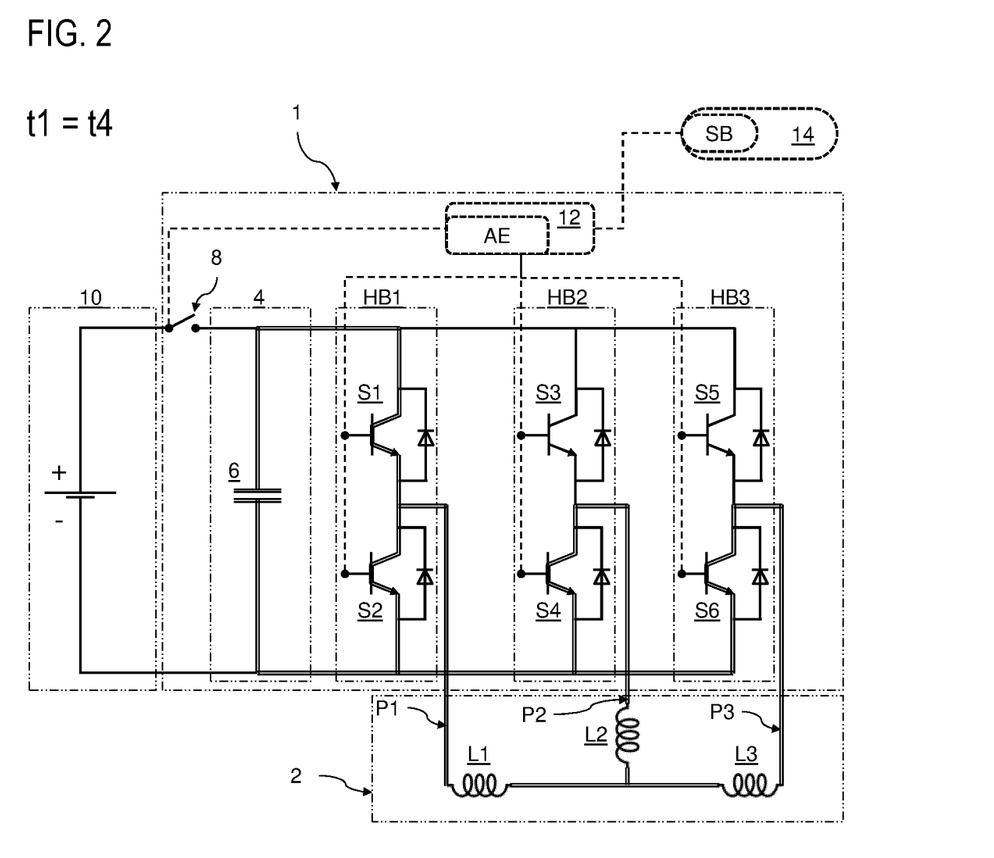
FIG. 2 shows the inverter according to FIG. 1 at a first time point further to the detection of a crash, upon the transition to a safe operating state.

In FIG. 2, the routing of the short-circuit current through the lower half-bridge switches S2, S4 and S6, and through the upper semi-circular switch S1, is represented by corresponding double broken lines.

Figure 3:
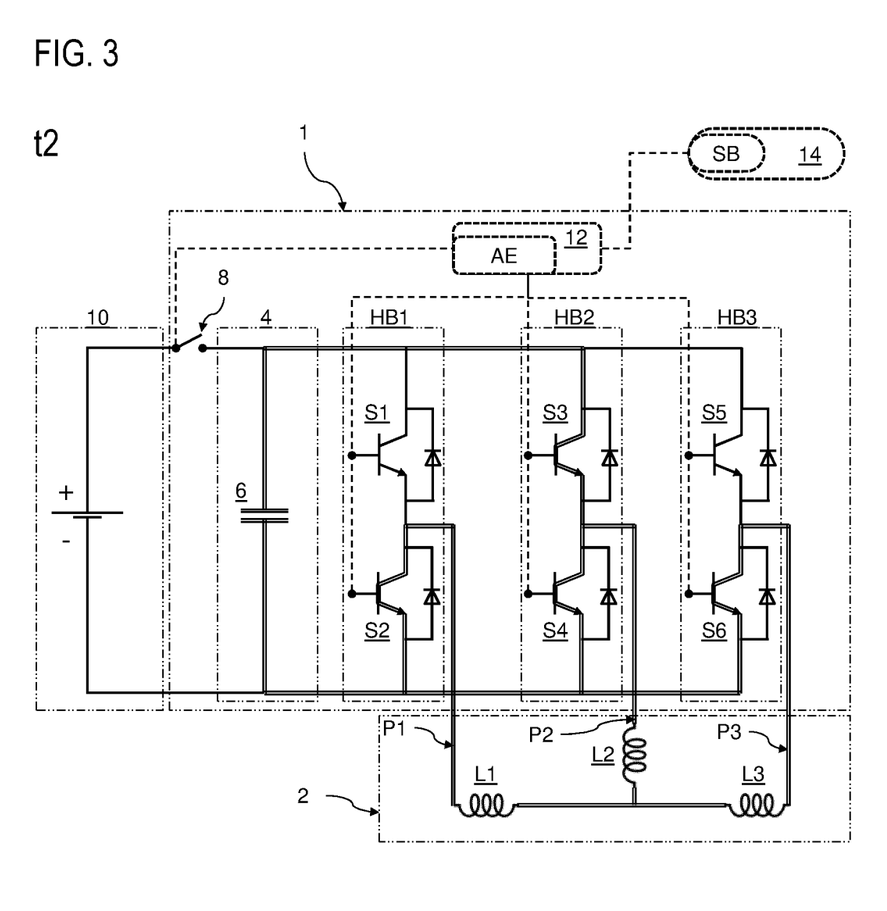
FIG. 3 shows the inverter according to FIG. 1 at a second time point further to the detection of a crash, upon the transition to a safe operating state.

Correspondingly, in FIG. 3, the temporally sequential routing of the short-circuit current through the upper half-bridge switch S3 is represented by double broken lines.

Figure 4:
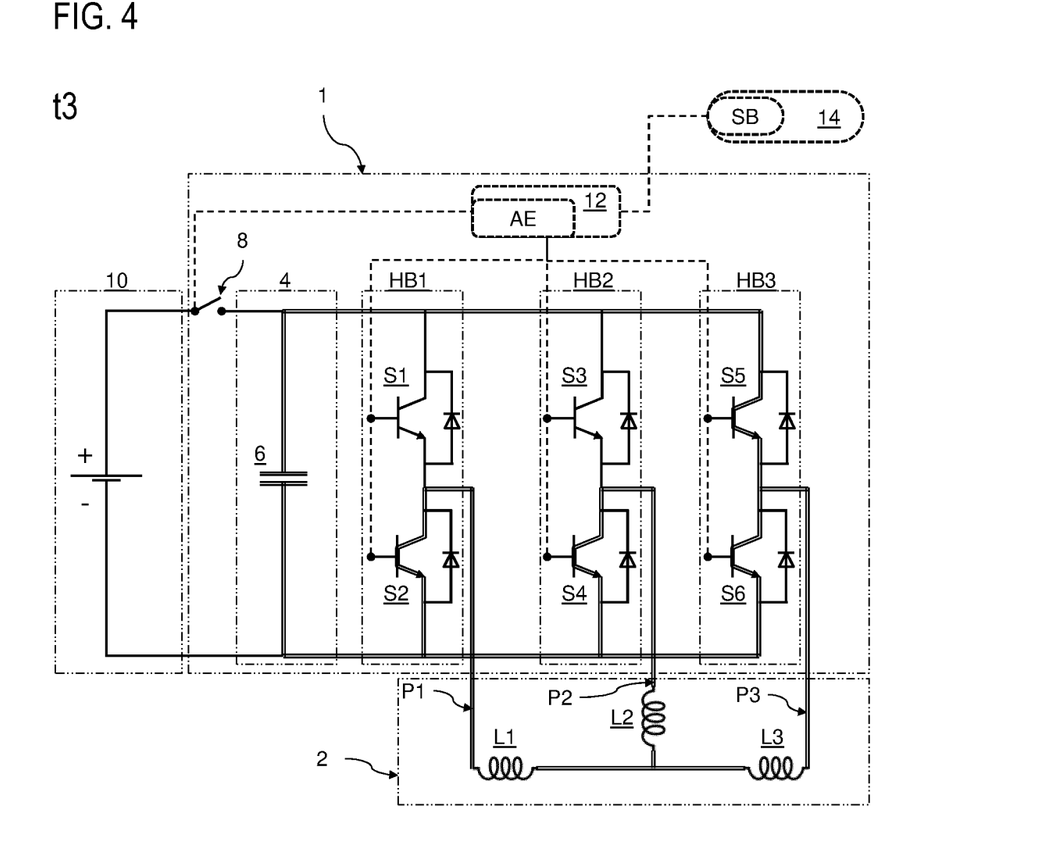
FIG. 4 shows the inverter according to FIG. 1 at a third time point further to the detection of a crash, upon the transition to a safe operating state.

Correspondingly, in FIG. 4, the sequential routing of the short-circuit current through the upper semi-circular switch S5, in turn, is represented by double broken lines.

Figure 5:
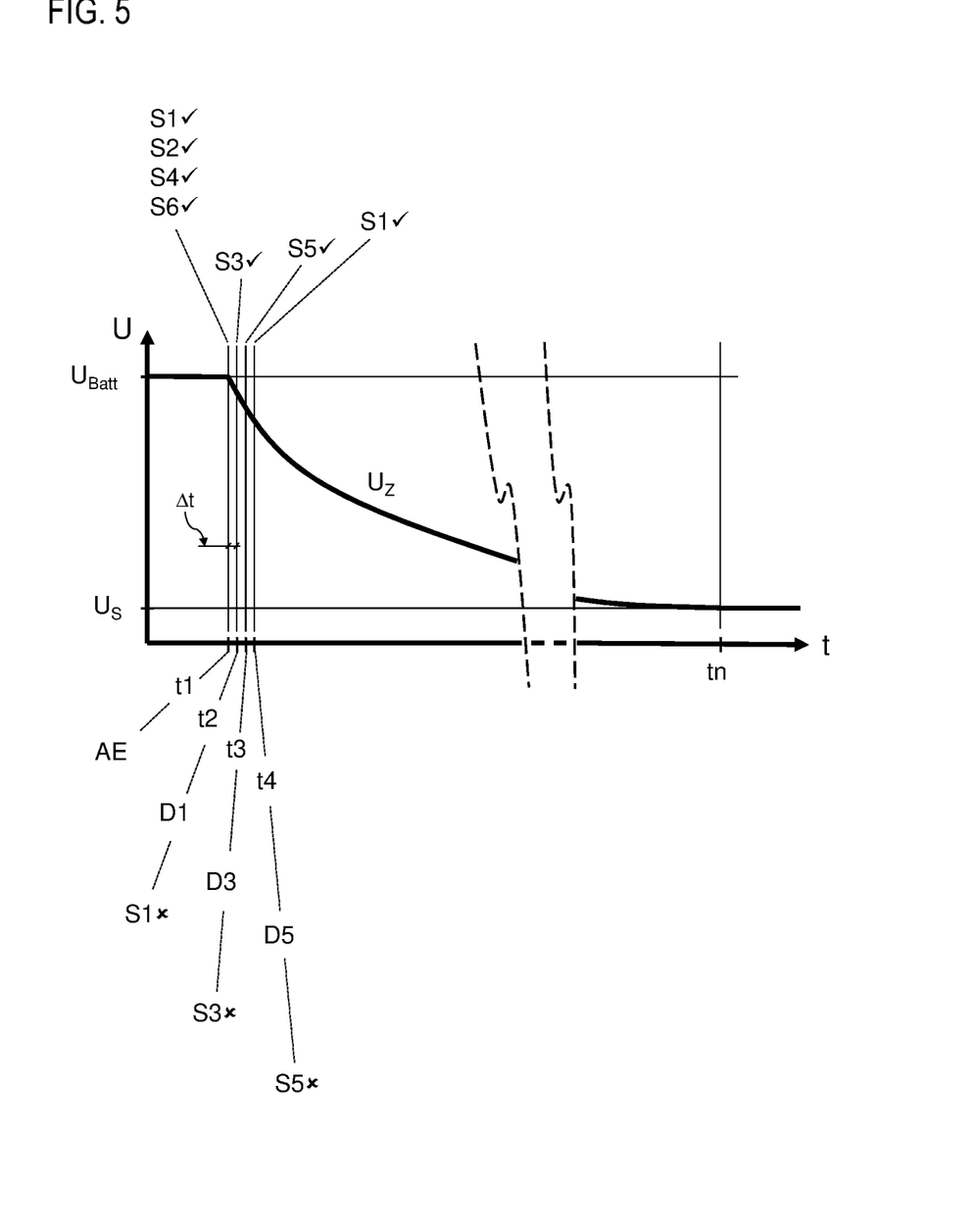
FIG. 5 shows a diagram of the voltage characteristic on the DC link capacitor over time in the event that, by way of the control apparatus according to FIGS. 1-3, a method is executed according to an exemplary embodiment of the invention.

FIG. 5 shows a diagram representing the movement of the voltage $U_z$ which is present on the DC link 6 before and after the triggering of an active discharge ASC, in conjunction with the temporal sequence for the switching of the upper half-bridge switches.

The diagram represents how an active discharge ASC is sustained for a sufficient length of time (t1 to tn), in order to permit the achievement of a non-critical voltage level $U_s$ on the DC link 4.

The sequential switching of the short-circuit current to the upper half-bridge switches S1, S3 and S5 in turn is timed at cyclic intervals such that, on the first upper half-bridge switch S1 to be energized, no short-circuit detection signal D1 is present, if the third upper half-bridge switch S5 to be energized, in turn, is switched to a short-circuit protection mode D5. In this manner, a sequential cyclic routing of the short-circuit current through the three upper half-bridge switches is possible throughout the full duration of the discharge time required (t1 to tn), until the DC link voltage $U_z$ achieves a non-critical DC link voltage value $U_s$.

Thus, in the exemplary embodiment, by way of the control apparatus 12, a method for the active discharge ASC of the DC link 4 is executed, comprising at least the following process steps:

(1) Detection of a crash, by way of a critical safety state, by way of the sensor device 14. (2) On the basis of this detection, activation of a safe operating mode SB of the inverter 1. (3) For the execution of the transition of the inverter 1 to the safe operating mode SB, isolation of the drive battery 10 from the DC link 4. (4) Switch-on of all the lower half-bridge switches S2, S4 and S6 of the inverter 1, in order to execute the transition of the prime mover to zero-vector operation. (5) Alternating switch-on of one of the lower half-bridge switches S1, S3 and S5 of the inverter 1 in each case, with a mutual temporal offset, resulting, in the exemplary embodiment, from the triggering of short-circuit detection in the previously switched-on half-bridge switch.

Step (5) is repeated and step (4) is sustained, until the voltage Uz present on the DC link, originating from the battery voltage $U_{Batt}$, has fallen to a safe limiting value Us.

LIST OF REFERENCE SYMBOLS

1 Three-phase inverter
2 Vehicle prime mover
4 (DC) link
6 DC link capacitor
8 Battery switch
10 Drive battery
12 Control apparatus
14 Sensor device
AE Active discharge
Dx Short-circuit detection signal (desaturation detection signal)
HB1 Half-bridge for the modulation of the first current phase of the inverter
HB2 Half-bridge for the modulation of the second current phase of the inverter
HB3 Half-bridge for the modulation of the third current phase of the inverter
L1 Drive inductance of the first current phase P1
L2 Drive inductance of the second current phase P2
L3 Drive inductance of the third current phase P3
NB Normal operation
MB Motor operation
P1 First current phase
P2 Second current phase P2
P3 Third current phase P3
SB Safe operating mode
S1 Upper half-bridge switch of first half-bridge
S2 Lower half-bridge switch of first half bridge
S3 Upper half-bridge switch of second half-bridge
S4 Lower half-bridge switch of second half bridge
S5 Upper half-bridge switch of third half-bridge
S6 Lower half-bridge switch of third half bridge
tx Time point
Δt Temporal offset between the switching of the upper half-bridge switches
U Voltage
$U_{Batt}$ Battery voltage
$U_s$ Limiting value for safe DC link voltage
$U_z$ DC link voltage

The invention claimed is:

1. A control apparatus for a three-phase inverter of a vehicle prime mover, wherein the control apparatus is configured:
to actuate an active discharge of a DC link of the three-phase inverter,
to simultaneously switch on each lower half-bridge switch of the three-phase inverter during an active discharge, and
while each lower half-bridge switch is switched on, to switch on upper half-bridge switches of the three-phase inverter one at a time in an alternating manner.

2. The control apparatus according to claim 1, wherein the control apparatus is further configured:
to switch on an upper half-bridge switch of a further phase in conjunction with, or further to, a switch-off of the previously switched-on upper half-bridge switch.

3. The control apparatus according to claim 1, wherein the control apparatus is further configured:

to switch on an upper half-bridge switch of a further phase in conjunction with, or further to, an intervention of short-circuit detection on the previously switched-on upper half-bridge switch.

4. The control apparatus according to claim 1, wherein the control apparatus is further configured:
to switch a next upper half-bridge switch which is to be switched on, at latest, with a predefined temporal offset with effect from commencement of switching of the previous upper half-bridge switch.

5. A three-phase inverter for a vehicle prime mover, the three-phase inverter comprising:
three half-bridges, each having an upper half-bridge switch and a lower half-bridge switch, and
the control apparatus according to claim 1.

6. The three-phase inverter according to claim 5, wherein:
the half-bridge switches are configured in a form of IGBTs, and a temporal offset between sequential switch-on of two upper half-bridge switches does not exceed 10 microseconds.

7. The three-phase inverter according to claim 5, wherein:
the half-bridge switches are configured in a form of SiC MOSFETs, and a temporal offset between sequential switch-on of two upper half-bridge switches does not exceed 3 microseconds.

8. A method for active discharge of a DC link of a three-phase inverter of a vehicle prime mover, the method comprising:
isolating a drive battery from the DC link of the three-phase inverter,
simultaneously performing switch-on of each lower half-bridge switch of the three-phase inverter, and
while each lower half-bridge switch is switched on, performing switch-on of upper half-bridge switches of the three-phase inverter one at a time in an alternating manner.

9. The method according to claim 8, wherein:
the switched-on upper half-bridge switches are alternated until such time as a voltage present on the DC link falls below a limiting value.

\* \* \* \* \*